United States Patent [19]

Miyagi

[11] Patent Number: 4,506,907
[45] Date of Patent: Mar. 26, 1985

[54] BABY CARRIAGE

[75] Inventor: Takeshi Miyagi, Osaka, Japan

[73] Assignee: Zojirushi Baby Co., Ltd., Osaka, Japan

[21] Appl. No.: 501,393

[22] Filed: Jun. 6, 1983

[30] Foreign Application Priority Data

Dec. 11, 1982 [JP] Japan .............................. 57-217516

[51] Int. Cl.³ ........................... B62B 7/08; B62B 7/14
[52] U.S. Cl. ............................... 280/642; 280/47.37 R
[58] Field of Search ................ 280/642, 42, 47.37 R, 280/47.38

[56] References Cited

U.S. PATENT DOCUMENTS

| | | | |
|---|---|---|---|
| 2,401,342 | 6/1946 | Eckhardt | 280/643 |
| 2,872,203 | 2/1959 | Hedstrom | 280/643 |
| 2,951,708 | 9/1960 | Kujala | 280/642 |
| 4,007,947 | 2/1977 | Perego | 280/642 |
| 4,132,429 | 1/1979 | Woods | 280/647 |
| 4,248,443 | 2/1981 | Ohlson | 280/647 |
| 4,353,577 | 10/1982 | Giordani | 280/647 |

Primary Examiner—Richard A. Bertsch
Attorney, Agent, or Firm—Wenderoth, Lind & Ponack

[57] ABSTRACT

A baby carriage which essentially comprises a pair of wheeled front legs, a pair of wheeled rear legs, sliders having said front legs pivoted thereto and slidable along said rear legs, transverse rods pivoted at one end to said rear legs, rear bars having the other ends of said transverse rods pivoted thereto, rocker bars pivoted at the opposite ends to said rear legs and rear bars, rear rods pivoted at one end to said rocker bars, L-shaped levers pivoted to said rear legs between the mounting points of said rocker bars and rear wheels, pull bars pivoted to said levers and sliders, connector bars pivoted to said front legs and said rear legs between the mounting points of said rocker bars and rear wheels, intersecting pipes pivoted to said sliders and rear legs and each other in intermediate portions of said pipes, and a pusher bar.

8 Claims, 21 Drawing Figures

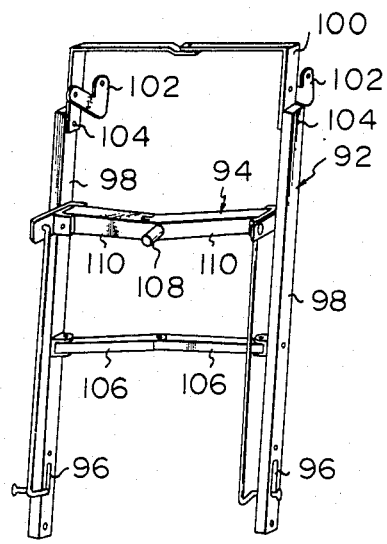
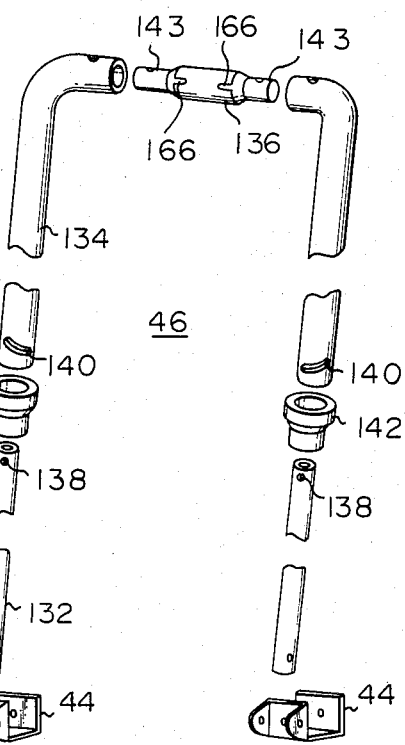

BABY CARRIAGE

BACKGROUND OF THE INVENTION

This invention relates to a baby carriage and more particularly, to a baby carriage which can be folded and unfolded in both fore-and-aft and widthwise direction with a slight force.

Although a variety of baby carriages have been known in the market, the conventional baby carriages are complicated in construction and troublesome in manipulation and thus, users have encountered difficulties in mastering the manipulation procedure of the carriages. Furthermore, conventional baby carriages were difficult to fold without removing the sunshades from the carriages and the sunshades consequently had to be removed before folding. Also the manipulation of conventional baby carriages was inconvenient.

SUMMARY OF THE INVENTION

The present invention is to provide a novel and improved baby carriage which can effectively eliminate the disadvantages inherent in the conventional baby carriages referred to above.

The above and other objects and attendant advantages of the present invention will be more readily apparent to those skilled in the art from a reading of the following detailed description in conjunction with the accompanying drawings which show one preferred embodiment of the invention for illustration purposes only, but not limiting the scope of the same in any way.

BRIEF DESCRIPTION OF THE DRAWINGS

FIG. 8 is a rear view of the reclining device as shown in FIG. 7;

FIG. 10 is a fragmentary exploded perspective elevational view of the pusher bar of the baby carriage with a portion thereof broken away;

PREFERRED EMBODIMENT OF THE INVENTION

Figure 1:
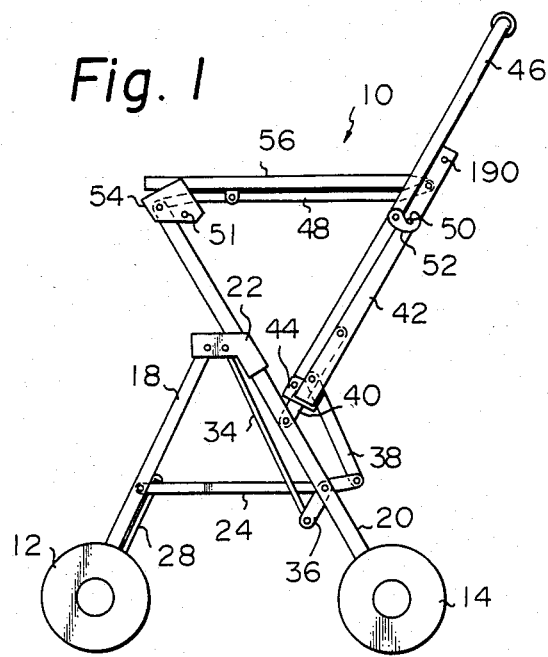
FIG. 1 is a side elevational view of the baby carriage constructed in accordance with the present invention showing the carriage in its unfolded or operative position.
Figure 4:
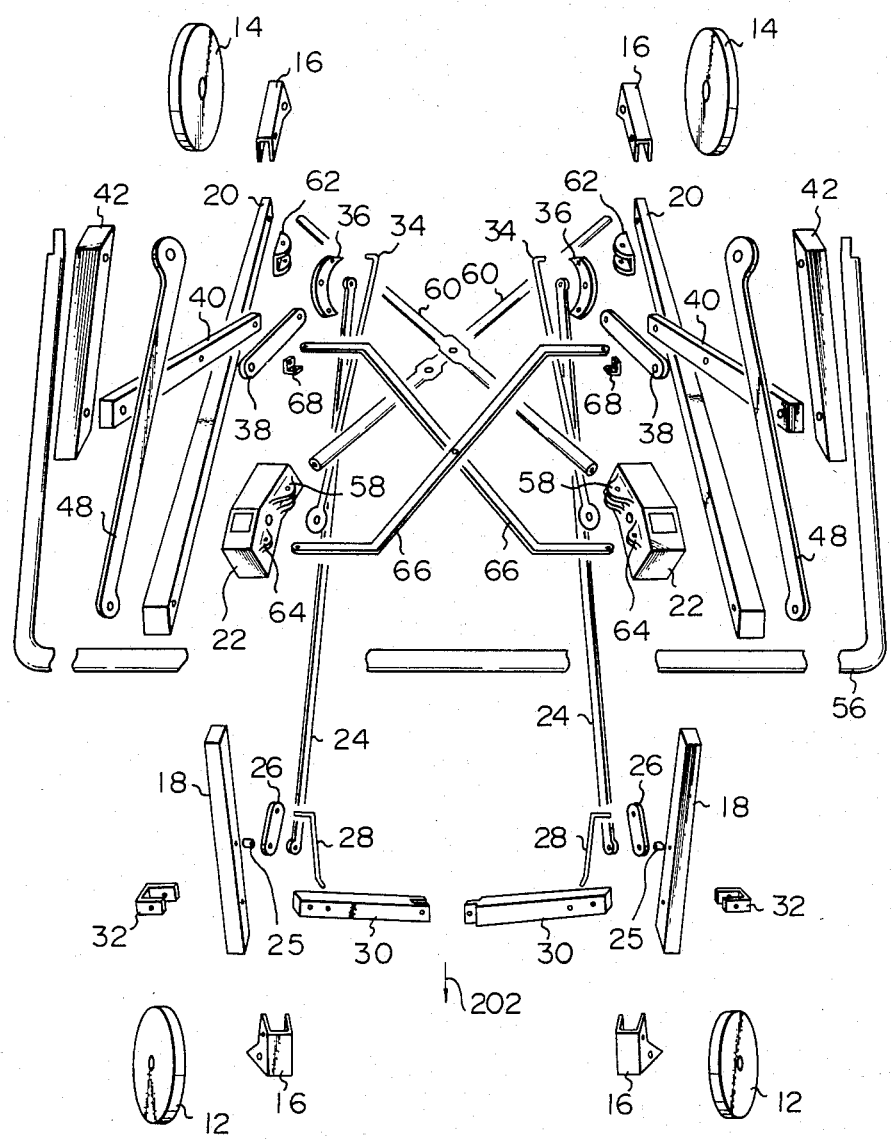
FIG. 4 is an exploded perspective front elevational view of the baby carriage.

The present invention will be now described referring to the accompanying drawings and more particularly, to FIG. 1 thereof in which the baby carriage 10 of the invention is shown in side elevation. Reference numerals 12 and 14 denote front and rear wheels, respectively. The front and rear wheels 12, 14 are attached to front and rear legs 18, 20, respectively, by means of conventional fixtures 16 (FIG. 4). The upper end of each of the front legs 18 is pivoted to an associated slider 22 which is adapted to slide along the associated rear leg 20 and is preferably formed of synthetic resin. The front end of a plate 26 and the front end of a connector bar 24 are pivoted to an intermediate portion of the associated front leg 18 by means of a common sleeve 25 and the rear end of the connector bar 24 is pivoted to the associated rear leg 20. Pivoted to the rear end of the plate 26 is the upper end of an associated front rod 28 the lower end of which is pivoted to an intermediate portion of its associated foot bar being one of a pair of foot bars 30. One end of each of the pair of foot bars 30 is pivoted to the associated front leg 18 by means of a fixture 32 secured to the leg 18 and the other or inner ends of the foot bars 30 are pivoted to each other by means of a pin (not shown) for downward pivotal movement. When the baby carriage is unfolded, the downward rotation of the foot bars 30 is prohibited by the front rods 28. Although not shown, foot plates are secured to the foot bars 30 as with conventional baby carriages.

The upper end of a pull bar 34 is pivoted to the associated slider 22 to which the upper end of the associated front leg 18 is also pivoted and the lower end of the pull bar 34 is pivoted to the lower end of an associated L-shaped lever 36 an intermediate portion of which is pivoted to the associated rear leg 20. A rear rod 38 is pivoted at the lower end to the upper end of the associated lever 36 and at the upper end to the central portion of an associated rocker bar 40. The central portion of the L-shaped lever 36 and the rear end of the connector bar 24 are preferably secured to the same or common point of the associated rear leg 20 by means of a common pin (not shown).

The rocker bar 40 is pivoted at the upper end to an associated rear bar 42 and at the lower end to the associated rear leg 20 in a position above the point of the latter where the lever 36 is pivoted to the rear leg. The lower end of a pusher bar 46 is pivoted to the lower ends of the rear bars 42 by means of fixtures 44 as shown in FIG. 10, for example. A transverse rod 48 is pivoted at the rear end to the upper end of the associated rear bar 42. A pin 50 is secured to the central portion of the associated rear bar 42 and engaged by an associated hook 52 pivoted to the pusher bar 46. The pusher bar 46 is pivoted in one or the other direction about the fixtures 44 so that the user can manipulate the baby carriage facing the face or the back of the baby carried in the carriage as desired. In the latter case, the pusher bar 46 is pivoted forwardly about the fixtures 44 until the hooks 52 engage front pins 51.

The front ends of the transverse bars 48 are pivoted to the upper ends of the rear legs 20. In the illustrated embodiment, the pivotal connection between the associated transverse bar 48 and rear leg 20 is covered by a protective cover 54 to prevent the user's finger or fingers from being caught in the pivotal connection. Although the pin 51 is secured to the cover 54, the cover 54 is not an essential component of the baby carriage, but an optional component and therefore, the pin 51 may be directly secured to the associated transverse bar 48 as desired. A conventional U-shaped hand-rail 56 is secured to the area of the associated rear bar 42 where the associated transverse bar 48 is pivoted to the rear bar and the hand-rail is designed to be folded in the central portion or the bite connecting the opposing legs of the U-shaped hand-rail. The hand-rail 56 is preferably secured in the central portion of the length thereof to the associated transverse bar 48 to prevent rattling of the hand-rail (see FIG. 1).

A projection 58 is formed adjacent to the rear end of the inner surface of each of the left- and right-hand sliders 22 and a pipe 60 having a flattened central portion is pivoted at the upper end to the associated projection 58. The lower end of the pipe 60 is pivoted to an associated fixture 62 secured to the associated rear leg 20. The pair of pipes 60 intersect each other in their flattened central portions at a slanted angle with the flattened central portions overlapping one another and being pinned to each other so that the baby carriage can be effectively prevented from swaying right and left. According to the present invention, in order to provide further rigidity to the framework of the baby carriage so as to ensure its safety, further projections 64 are formed on the inner surfaces of the pair of slides 22 adjacent to the front ends thereof and a pair of intersecting substantially S-shaped plates 66 are pivoted at the front ends to the projections 64 and disposed on fixtures 68 which are in turn pivoted to the upper ends of the rear rods 38. The fixtures 68, the upper end of the rear rod 38 and the central portion of the rocker bar 40 are preferably held together by means of a common fastener. The S-shaped plates 66 are also connected together in their intersecting central portions by means of a pin (not shown) to enhance safety of the baby carriage.

Figure 2:
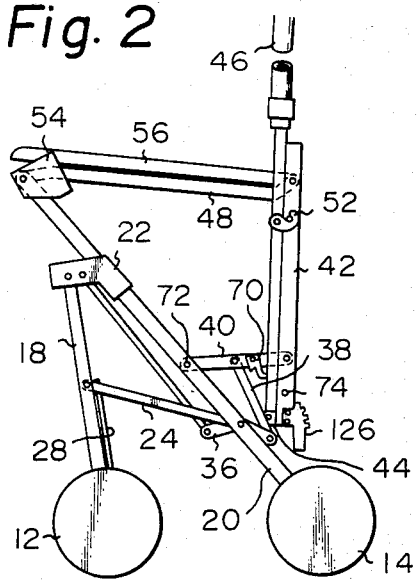
FIG. 2 is a side elevational view of the baby carriage showing the carriage in its partially folded or unfolded position.
Figure 5:
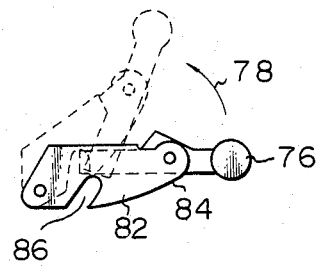
FIG. 5 is a fragmentary side elevational view of the locking device incorporated in the baby carriage.
Figure 6:
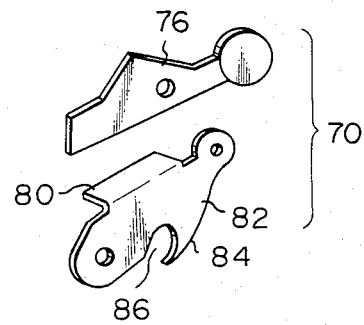
FIG. 6 is an exploded perspective view of the locking device of FIG. 5.

The baby carriage of the invention is held in its unfolded position by the employment of locking devices 70 one of which is shown in FIGS. 5 and 6. Since the locking devices 70 are identical with each other in construction and operation, only one of the locking devices and its associated components will be now described with the understanding that the same is equally applicable to the other locking device. In the illustrated embodiment, the locking device 70 is pivoted to the associated rocker bar 40 and normally biased in a clockwise direction as seen in FIG. 2 under the force of a spring (not shown). When the pusher bar 46 is initially inclined backwardly or pivoted in a clockwise direction as seen in FIG. 1 in unfolding the baby carriage, the rocker bar 40 pivots upwardly or in a counter-clockwise direction about the pin 72 as seen in FIG. 1 whereby the locking device 70 moves from the position shown in FIG. 2 to the solid line or horizontal position shown in FIG. 5. As the pusher bar 46 is further inclined backwardly, a lock pin 74 (FIG. 2) secured to the rear bar 42 contacts a lock lever 76 and a lock plate 82 having the flange 80 against which the lock lever 76 is adapted to abut is pushed upwardly by a small distance in the direction shown by the arrow 78 against the spring force applied to the locking device 70. The lock pin 74 slides along the cam face 84 of the lock plate 82 into an indent 86 in the lock plate 82 whereupon the lock plate 82 is biased in the direction opposite to the arrow 78 under the force of the spring whereby the locking device 70 assumes its locking position or the associated rocker and rear bars 40, 42 align with each other to thereby lock the baby carriage in its perfectly unfolded or operative position. In the locked position of the baby carriage, the front and rear legs 18, 20 are held in their stretched or spread position by the connector bars 24 and, at the same time, the upper portion of the rear legs 20 and the associated rear bars 42 are held in their stretched or spread position by the transverse rods 48 and thus, the rear bars 42 and front legs 18 are held in their stretched or spread position by the rocker bars 40, rear rods 38, levers 36 and connector bars 24. Furthermore, the intersecting pipes 60 and the intersecting plates 66 impart rigidity to the baby carriage in its unfolded or operative position. The locking device and its associated pin may interchange the position therebetween or they may be installed in other positions.

Figure 7:
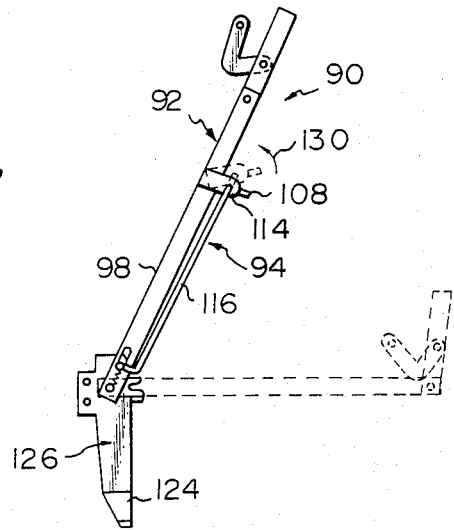
FIG. 7 is a fragmentary side elevational view of the reclining device incorporated in the baby carriage.
Figure 9:
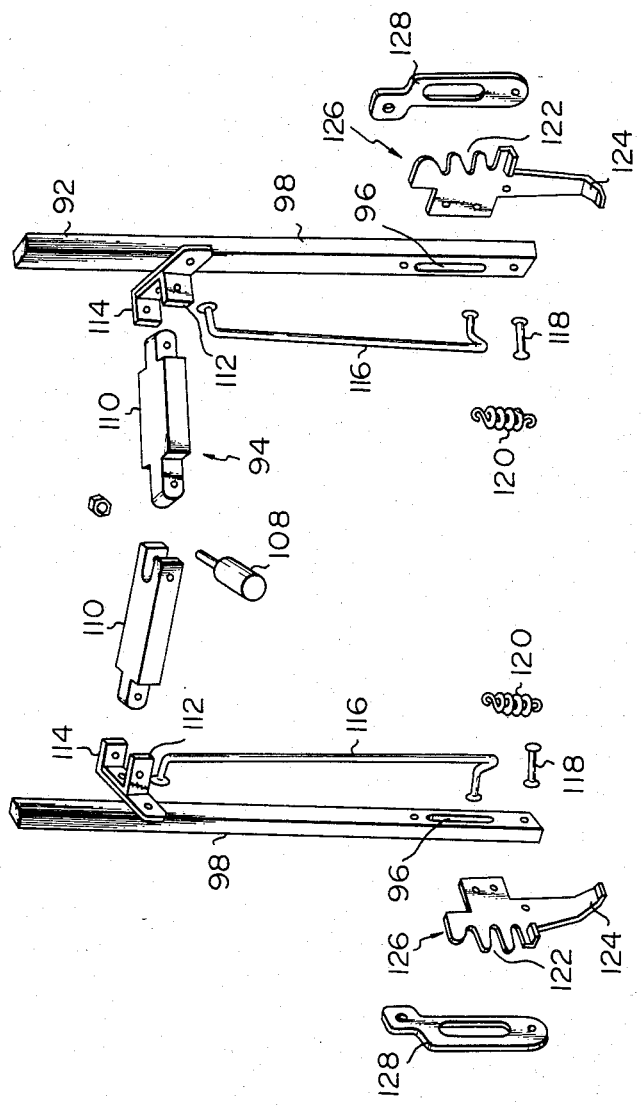
FIG. 9 is an exploded perspective rear view of the reclining device of FIGS. 7 and 8 with a portion thereof broken away.

FIGS. 7 through 9 show the reclining device employed in the baby carriage of the invention. The reclining device 90 generally comprises a framework 92 and an operation means 94. The framework 92 comprises a pair of upright rods 98, 98 each having an elongated slot 96 adjacent to the lower end thereof and a pair of L-shaped members 100, 100 connected to the upper ends of the rods 98 by means of pins 104. Each of the L-shaped members 100 consists of an upright portion and a horizontal portion. The upright portion is pivoted at the lower end to the upper end of the associated rod 98 by the associated pin 104. The upper end of each upright portion and one end of the associated horizontal portion are pivoted (not shown) for rotation in the same direction as an associated auxiliary rod 106 of which description will be made hereinafter. The other or inner ends of the horizontal portions of the L-shaped members 100 are pivoted to each other whereby the reclining device 90 can be folded when the baby carriage is folded. An L-shaped arm 102 is pivoted at one end to a point adjacent to one end of the associated L-shaped member 100 and operatively connected to the associated rear bar 42 of the baby carriage by means of a belt or the like whereby when the reclining device 90 is tilted to the broken line shown in FIG. 7, the arms 102 are raised up and the L-shaped members 100 are pivoted upwardly about their pins 104 to thereby provide an enclosure which embraces the head of the baby carried in the carriage from three directions. In FIG. 8, the pair of auxiliary rods 106 connect between the two upright rods 98 in their intermediate portions to reinforce the framework 92. The inner or adjacent ends of the auxiliary rods 106 are pivoted to each other by means of a pin (not shown) and the other or outer ends of the rods 106 are pivoted to the upright rods 98 whereby the auxiliary rods are folded down when the framework is folded.

The tilting angle of the reclining device 90 is adjusted by upwardly rotating the lever 108 of a manipulation device 94. The lever 108 is attached to the adjacent or inner ends of a pair of manipulation rods 110 which are pivoted to each other by means of a pin (not shown). The other or outer ends of the manipulation rods 110 are pivoted to the upright rods 98 with two L-shaped members 112, 114 which are disposed in reverse relationship with each other interposed therebetween as shown in FIG. 9, for example. Pivoted to the end of the L-shaped member 114 which normally projects from the back side of the reclining device 90 is the upper end of an associated connector rod 116. The lower end of the connector rod 116 is received in the elongated slot 96 formed in the associated upright rod 98 adjacent to the lower end of the latter. The connector rod 116 is normally urged downwardly (toward the bottom of the slot 96) under the force of a spring 120 anchored to the rod 116 and to a pin 118 and adapted to enter a selected one of a plurality of grooves 122 of which description will be made hereinafter. The pin 118 secures an intermediate portion of a plate 126 including the plurality of angle regulation grooves 122 in an upper portion and a foot 124 at the lower end and the lower end of a cover 128 covering the outer surface of the plate 126 to the associated upright rod 98. As more clearly shown in FIGS. 2 and 3, the plate 126 is also attached to the associated rear bar 42. The upper end of the cover 128 is secured to the associated rod 98 by means of another pin (not shown). In this way, in the reclining device 90, when the lever 108 is rotated in the direction of the arrow 130 as shown in FIG. 7 against the force of the springs 120 through the L-shaped members 112, 114 and the manipulation rods 110, the lower ends of the connector rods 116 rise along the slots 96 in the rods 98 whereby the connector rods 116 clear the grooves 122 in which the rods were engaged. Thereafter, the reclining device 90 is moved to a desired position and the lever 108 is released whereupon the lever 108 is urged to rotate in the direction opposite to the arrow 130 under the force of the springs 120 and the connector rods 116 are forced to engage in selected ones of the grooves 122 to arrest the rotation of the reclining device 90. The reclining device 90 can be rotated between the horizontal position shown by the broken line and the raised position shown by the solid line in FIG. 7 by manipulating the lever 108.

Figure 11:
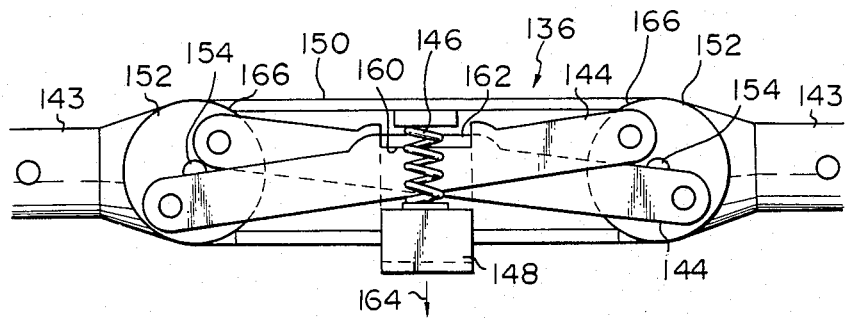
FIG. 11 is a fragmentary view showing the details of the pusher bar operation means incorporated in the baby carriage in its unfolded position.

Description will now be made of the pusher bar 46. As more clearly shown in FIGS. 1 through 3, the pusher bar 46 is pivoted at the lower end to the rear bars 42 by means of the fixtures 44. As well known in the art, when the pusher bar 46 is pivoted by such an angle that the hooks 52 disengage from the rear pins 50 and engage the front pins 51 (FIG. 1), the user can operate the baby carriage facing the face of the baby carried in the carriage. In order that the pusher bar 46 can be folded in the widthwise direction of the carriage, the pusher bar 46 can have the construction shown in FIGS. 10 through 13. That is, the pusher bar 46 comprises a pair of lower hollow bar members 132, a pair of substantially L-shaped upper hollow bar members 134 and a horizontal operation means 136. The lower bar member 132 is pivoted at the lower end to the associated fixture 44 and has a pin 138 at the upper end. The pin 138 is received in a slot 140 formed adjacent to the lower end of the associated upper bar member 134 and having dimensions sufficient to accomodate the pin 138. Covers 142 surround the junctions between the associated lower and upper bar portions 132, 134 to prevent the pins 138 from coming off the grooves 140. The upper ends of the upper bar members 134 are bent substantially at right angles to the rest of the bar members to receive the opposite ends of the operation means 136. As more clearly shown in FIG. 11, the operation means 136 comprises a pair of operation members 143 one end of which is connected to the upper bar members 134, a pair of actuation members 144, a spring 146, a spring pusher member 148 and a case 150 covering the operation members, actuation members, spring and spring member. The inner end of the operation member 143 has a circular portion 152 including the core 154 to which the case 150 is secured. The pair of actuation members 144 are pivoted to the circular portions 152 in diametrically opposing relationship. As more clearly shown in FIG. 13, the actuation member 144 has a pair of spaced convexes 156, 158 projecting from one side of the member in the central portion thereof and a sloped recess 16 is defined between the convexes 156, 158. The height of the convex 156 is higher than the convex 158. When the pusher bar 46 is unfolded, the recesses 166 in the two actuation members 144 align with each other as shown in FIG. 11 and the pawl 162 of the spring pusher member 148 engages in the aligned recesses 160. The pawl 162 of the spring pusher member 148 biased in the direction of the arrow 164 in FIG. 11 under the force of the spring 146 resiliently engages the convexes 156, 158 and recesses 160 to prevent the rotation of the actuation members 144. When the spring pusher member 148 is pushed in the direction opposite to the arrow 164 against the force of the spring 146, the pawl 162 is disengaged from the convexes and recesses and thus, the operation means 136 can freely move in the direction opposite to the arrow 164 (see FIG. 12). As the operation means 136 moves in this manner, the circular portions 152 of the operation members 143 slide within the grooves 166 at the opposite ends of the case 150 and the upper bar members 134 rotate relative to the pins 138 on the lower bar members 132 to thereby reduce the width of the pusher bar 46.

Figure 12:
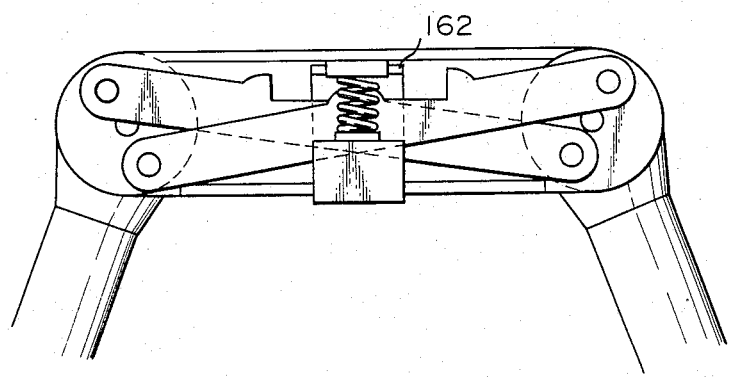
FIG. 12 is similar to FIG. 11, but shows the pusher bar operation means in its folded position.
Figure 13:
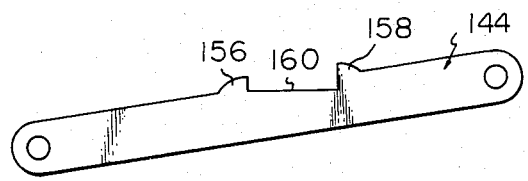
FIG. 13 is a fragmentary plan view of one of the actuation members incorporated in the pusher bar operation means of FIGS. 11 and 12.
Figure 14:
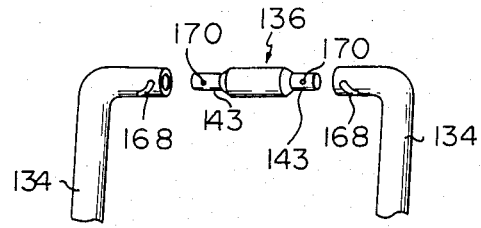
FIG. 14 is an exploded perspective view of another embodiment of the pusher bar operation means incorporated in the baby carriage.
Figure 15:
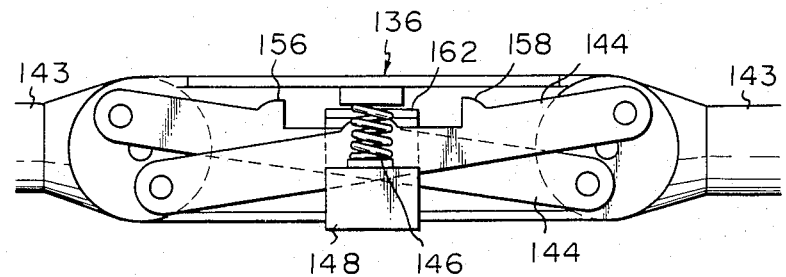
FIG. 15 is a view showing the details of another embodiment of the pusher bar operation means shown in its unfolded position.
Figure 16:
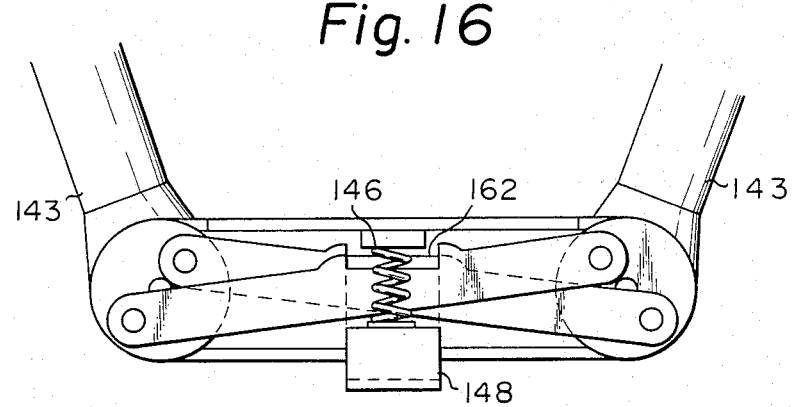
FIG. 16 is a view showing the details of still another embodiment of the pusher bar operation means in its folded position.

FIGS. 14 through 16 show other embodiments of the pusher bar of the baby carriage of the invention. In the embodiment of FIG. 14, a guide groove 168 is formed in the horizontal portion of each upper bar member 134 extending by an angular distance of 90° the circumference of the horizontal portion. In the embodiment of FIG. 15, although the convexes 158 on the actuation members 144 are shown as being spaced from each other sufficient to allow the pusher bar to be unfolded, the means 136 is so positioned as to be rotated 90° from the position of the corresponding components in the foregoing embodiments. Therefore, even when the operation means 136 is in its released state, since the rotation of the operation means 136 is limited by the circular portions of the operation members engaging in the grooves in the case, the pusher bar can not be unfolded. That is, if the operation means 136 in the embodiment of FIG. 14 is to be folded upwardly, although the operation means 136 is allowed to rotate, the operation means can not be folded upwardly because the upper bar members 134 do not allow the operation means 136 to fold itself upwardly. However, if the pins 170 are rotated by 90° along the grooves 168 from the position shown in FIG. 14, the operation means 136 assumes the same position as that shown in FIG. 10. When the operation means 136 is simply pushed in this position without operating the spring pusher member 148, the operation members 143 fold freely because the spring pusher member 148 is then in its released state. As the operation members continue to fold the convexes 156 on the actuation members 144 clear the pawl 162 whereupon the pawl 162 of the spring pusher member 148 snaps to abut against the sloped recesses 160 in the actuation members 144 under the force of the spring 146 to thereby limit further pivotal movement of the actuation members 144. That is, the embodiment of FIGS. 15 and 16 are unfolded and folded in the position reverse to that in which the embodiment of FIGS. 11 and 12 unfolded and folded. In the embodiment of FIGS. 11 and 12, the pusher bar can be simply unfolded and folded because the pusher bar of FIGS. 11 and 12 is simpler in construction, but the embodiments of FIGS. 15 and 16 have the advantage that the unfolding of the pusher bar can be precisely limited after the folding thereof.

Figure 17:
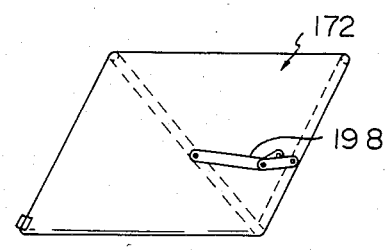
FIG. 17 is a perspective side elevational view of the sunshade incorporated in the baby carriage.
Figure 18:
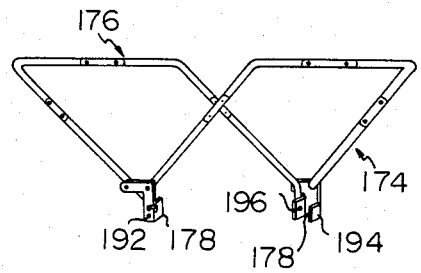
FIG. 18 is a side elevational view of the frameworks of the sunshade of FIG. 17.

FIGS. 17 through 21 show the sunshade or hood 172 to be employed in connection with the baby carriage of the invention. The hood 172 has the construction as shown in FIG. 17 and incorporates two frameworks 174 and 176 therein. The two frameworks 174 and 176 are substantially similar to each other except for the manner in which the frameworks 174 and 176 are attached to substantially U-shaped mounting pieces 178 which are adapted to mount the hood 172 on the baby carriage. Each of the frameworks 174, 176 comprises a pair of straight lower frames 180, a pair of substantially L-shaped upper frames 182, a central frame 184 and connector pieces 186 connecting the lower and upper frames 180, 182 together. The lower frames 180 are mounted at the lower ends on the bites 188 of the mounting pieces 178 by means of pins (not shown). As more clearly shown in FIG. 21, the lower frames 180 of the framework 176 are flattened at the lower ends which are formed with holes. The flattened lower end of each of the lower frames 180 is attached to one or the inner arm of each of the pair of arms 194 which extend from the bite 188 in the associated mounting piece 178 by means of a pin 196 which passes through the aligned holes in the lower end of the lower frame and in the one arm 194. The bite 188 of the mounting piece 178 is formed with a hole 192 for receiving the pin 190 (FIG. 1) at the upper end of the associated rear bar 42 of the baby carriage. The arms 194 of the mounting piece 178 are adapted to embrace the associated rear bar 42 on the opposite sides of the bar. Thus, the framework 174 is pivoted to the associated mounting piece 178 whereas the framework 176 is rigidly secured to the mounting piece. The upper end of the lower frame 180 and the lower end of the upper frame 182 are pivoted to the lower and upper ends of their common connector piece 186, respectively. The connector piece 186 has a substantially semicircular cross-section and has a notch formed on the back. As shown by the broken line in FIG. 19, when the sunshade or hood 172 is folded down, the inner ends of the horizontal portions of the upper frames 182 are pinned to the central frame 184. The sunshade 172 can be perfectly unfolded by folding a conventional lever 198 pivoted at the opposite ends thereof to the frameworks 174, 176 in a position beyond the dead point thereof. The sunshade 172 can be easily and simply mounted on the baby carriage by embracing the pins 190 on the rear bars 42 and applying the hooks 200 on the bites 188 of the mounting pieces 178 to the pins 190.

Figure 19:
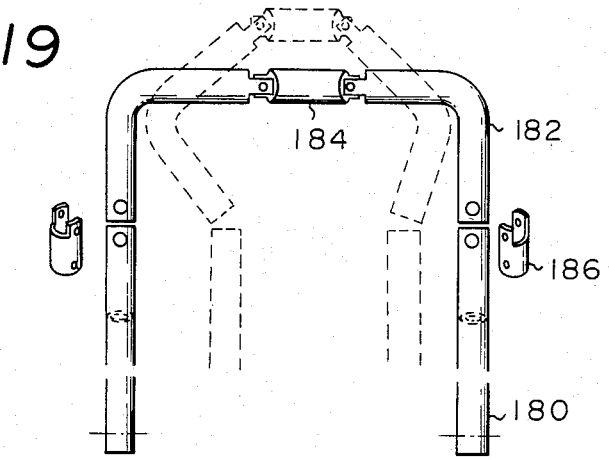
FIG. 19 is an elevational view of one of the frameworks shown in FIG. 18.
Figure 20:
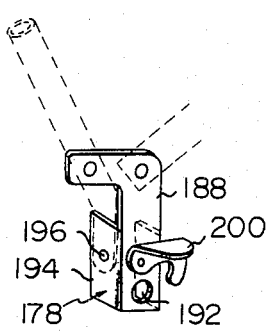
FIG. 20 is a perspective view of one of the fixtures employed in either of the frameworks of FIG. 19.
Figure 21:
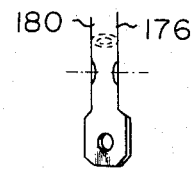
FIG. 21 is a fragmentary elevational view of the lower end of one of the lower frame members in either of the frameworks of FIG. 18.

When the width of the baby carriage is reduced or the carriage is folded down, the sunshade 172 can be folded down or reduced in width as shown by the broken line in FIG. 19 in accordance with the reduction in width of the carriage by merely releasing the lever 198.

According to the present invention, when it is desired to fold the baby carriage from the unfolded or operative position of the carriage as shown in FIG. 1 in order to reduce the dimensions of the carriage in both the fore-and-aft and widthwise directions, the following procedure is carried out. First of all, the lock lever 76 of the locking device 70 (FIG. 5) pivoted to each of the rocker bars 40 is pivoted in the direction of the arrow 78 until the apex of the triangular shape of the lever 76 abuts against the flange 80 on the lock plate 82. As the lock lever 76 is further pivoted in the direction of the arrow 78, against the force of the spring, the lever 76 slides about the lock pin 74 (FIG. 2) which engages in the indent 86 in the lock plate 76. As the lock lever 76 is further pivoted in this direction, the distal end of the lever 76 rides on the lock pin 76 as shown by the broken line in FIG. 5 to cease its pivotal movement. Thereafter, the pusher bar 46 is pushed forwardly by manipulating the operation means 136 on the pusher bar 46 until the pin 74 disengages from the associated locking device 70 to assume the position shown in FIG. 2 so as to reduce the dimension of the baby carriage in the fore-and-aft direction. At this time, the pusher bar 46 and rear bars 42 pivot downwardly in a clockwise direction about the pins 72 at the lower ends of the rocker bars 40 as seen in FIG. 1 and at the same time, push the upper portions of the rear legs 20 forwardly through the transverse rods 48 to tilt the rear bars 20 forwardly and rotate the rocker bars 40. In response to the rotation of the rocker bars 40, the rear rods 38 force the L-shaped levers 36 to rotate in a clockwise direction as seen in FIG. 1 to pull the pull bars 34 upwardly along the rear legs 20. The upward movement of the pull bars 34 causes the slider 22 to move upwardly along the rear legs 20 and as the slider 22 move upwardly, the front legs 18 tilt forwardly under the control of the connector bars 24. As the front legs 18 tilt forwardly, the connector bars 24 push down the pair of foot bars 30 in the intermediate portions thereof through the front rods 28 which support the foot bars in their intermediate portions of the latter whereby the pivoted inner ends of the foot bars 30 are pivoted downwardly in the direction of the arrow 202 as shown in FIG. 4.

The above-mentioned rotation of the rocker bars 40 increases the distance between the sliders 22 and fixtures 62 and between the sliders 22 and fixtures 62, respectively. Thus, the intersecting pair of plates 66 and the intersecting pair of pipes 60 pivot toward each other about their intersecting or pivot points, respectively, so as to draw the rear bars 42 toward each other thereby reducing the widthwise (or right to left) dimension of the baby carriage.

As the rear bars 42 approach each other, the right and left rods 98 of the reclining device 90 attached to the rear bars 42 are drawn toward each other. At this time, the auxiliary bars 106, manipulation rods 110 and L-shaped arms 102 pivot about their pivot points. And as regards the pusher bar 46, since the upper bar members 13 have rotated about the associated lower bar members 132 when the operation means 136 has been operated in the initial phase of the folding of the baby carriage, the upper bar members 134 have approached each other and the lower bar members 134 also have approached each other. Furthermore, as the rear bars 42 on which the sunshade 172 is mounted approach each other, the mounting pieces 178 on the sunshade 172 approach each other and as a result, the frameworks 174, 176 of the sunshade 172 assume the position shown by the broken line in FIG. 19 to thereby reduce the width of the sunshade 172. It will be appreciated that the distance between the hand-rails 56, having the same construction as the frameworks 174, 176, can be reduced in concert with the approaching movement of the lower bar members 132 of the pusher bar 46.

Figure 3:
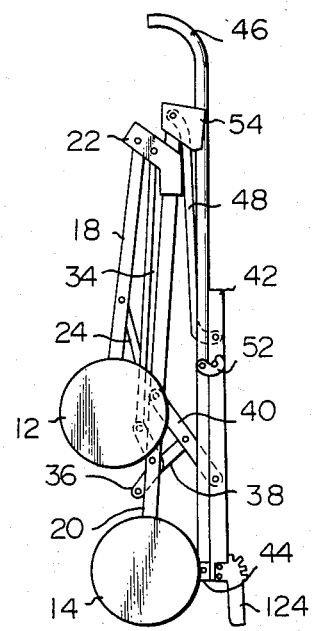
FIG. 3 is a side elevational view of the baby carriage showing the carriage in its perfectly folded position.

When the folding operation on the baby carriage has been completed by pushing the operation means 136 forwardly to its predetermined maximum distance, the baby carriage is safely supported in its perfectly folded position on the rear wheels 14 and stands 124 as shown in FIG. 3. In order to maintain the baby carriage in the folded position as shown in FIG. 3, conventional hooks (not shown) may be interposed between the front legs 18 and rear legs 20.

In the folding of the baby carriage as mentioned hereinabove, it is necessary that the pusher bar 46 is set in its rearwardly tilted position as shown in FIG. 1, that the reclining device 90 is set in its predetermined highest or substantially upright position as shown by the solid line in FIG. 7, and that the lever 198 on the sunshade 172 is unlocked and the framework 174 is preferably moved close to the framework 176.

When the baby carriage is unfolded from the position shown in FIG. 3 to the position shown in FIG. 1, after the hooks holding the baby carriage in its folded position have been unlocked, it is only necessary to pull the operation means 136 on the pusher bar 46 upwardly. In this case, when the pusher bar of FIG. 14 is employed, the spring pusher member 148 has to be pushed to release the pawl 162 on the pusher member from the convexes on the actuation member 144. The folding procedure on the baby carriage is reversed when the carriage is to be unfolded. The unfolding operation is assisted by the weight of the components of the baby carriage. When the baby carriage has been perfectly unfolded, the horizontal portions of the upper bar members 134 of the pusher bar 46 of FIG. 10 align with each other and the pawl 162 of the spring pusher member 148 snaps in the sloped recesses 160 in the actuation members 144 to thereby complete the locking of the baby carriage. When the pusher bar of FIG. 14 is employed, after the horizontal portions of the upper bar members 134 have aligned with each other, the operation means 136 of the embodiment of FIG. 14 is rotated by 90° to thereby lock the baby carriage perfectly in its unfolded condition.

As clear from the foregoing description, according to the present invention, since the unfolding of the baby carriage is accomplished by sliding the sliders 22 along the rear legs 20, the unfolding operation is quite smooth and since there is no possibility that the axes of rotation about which the rotary components pivot frequently change from one to another as experienced in the prior art baby carriages, the angle and/or force for folding and unfolding of the baby carriage will not increase or reduce adruptly, thereby ensuring safe operation. Furthermore, the baby carriage can be folded or unfolded without removing the sunshade or hood from the carriage. Thus, the present invention provides a baby carriage which is quite convenient to the user for use. And by the use of the improved pusher bar, since the folding and unfolding of the baby carriage can be rapidly and precisely performed, the present invention provides a safe baby carriage which can be positively locked.

While only one embodiment of the invention has been shown and described in detail, it will be understood that the same is for illustration purpose only and should not be taken as a definition of the invention, reference being made for this purpose to the appended claims.

What is claimed is:

1. A baby carriage comprising a pair of front legs having front wheels mounted at the lower ends, a pair of rear legs having rear wheels mounted at the lower ends, sliders having the upper ends of said front legs pivoted to said sliders and slidable along said rear legs, transverse rods pivoted at one end to the upper ends of said rear legs, rear bars having the other ends of said transverse rods pivoted to the upper ends of said rear bars, rocker bars pivoted at the opposite ends to said rear legs and said rear bars, rear rods pivoted at one end to intermediate portions of said rocker bars, L-shaped levers pivoted in intermediate portions to the junctions between the mounting areas of said rocker bars and said rear wheels on said rear legs and having the other ends of said rear bars pivoted to one end of said L-shaped levers, pull bars pivoted at the lower ends to the other ends of said L-shaped levers and at the upper ends to said sliders, connector bars pivoted at one end to intermediate portions of said front legs and at the other ends to said rear legs between the mounting points of said rocker bars and said rear wheels on the rear legs, intersecting pipes pivoted to each other in intermediate portions and arranged in X-configuration, one of said pipes being pivoted at the upper end to the slider on one side of said baby carriage and at the lower end to a lower portion of the rear leg on the other side of said baby carriage and the other of said pipes being pivoted at the upper end to a lower portion of said rear leg on the other side of said baby carriage and at the lower end to the slider on said one side of the baby carriage and a pusher bar having a folding manipulation member and foldable in both the fore-and-aft and widthwise directions.

2. The baby carriage as set forth in claim 1, further including a reclining device the tilting angle of which is adjustable by rotating manipulation rod means to one position.

3. The baby carriage as set forth in claim 2, further including a hood having at least one framework comprising a central frame and lower and upper frames, said baby carriage being capable of being folded and unfolded without removing said hood from the baby carriage.

4. The baby carriage as set forth in claim 3, in which said pusher bar comprises lower bar members attached to said rear bars, L-shaped upper bar members rotatable relative to said lower bar members and operation means, and operation means having operation members connected between said L-shaped upper bar members, actuation members, a spring and a spring pusher member whereby when said operation member is operated said spring locks or closes said operation means.

5. The baby carriage as set forth in claim 2 in which said pusher bar comprises lower bar members attached to said rear bars, L-shaped upper bar members rotatable relative to said lower bar members and operation means, and operation means having operation members connected between said L-shaped upper bar members, actuation members, a spring and a spring pusher member whereby when said operation member is operated said spring locks or closes said operation means 6. The baby carriage as set forth in claim 1, further including a hood having at least one framework comprising a central frame and lower and upper frames, said baby carriage being capable of being folded and unfolded without removing said hood from the baby carriage.

7. The baby carriage as set forth in claim 6 in which said pusher bar comprises lower members attached to said rear bars, L-shaped upper bar members rotatable relative to said loer bar members and operation means, and operation means having operation members connected between said L-shaped upper bar members, actuation members, a spring and a spring pusher member whereby when said operation member is operated said spring locks or closes said operation means.

8. The baby carriage as set forth in claim 1, in which said pusher bar comprises lower bar members attached to said rear bars, L-shaped upper bar members rotatable relative to said lower bar members and operation means, said operation means having operation members connected between said L-shaped upper bar members, actuation members, a spring and a spring pusher member whereby when said operation member is operated said spring locks or closes said operation means.

* * * * *